Figure 1A:
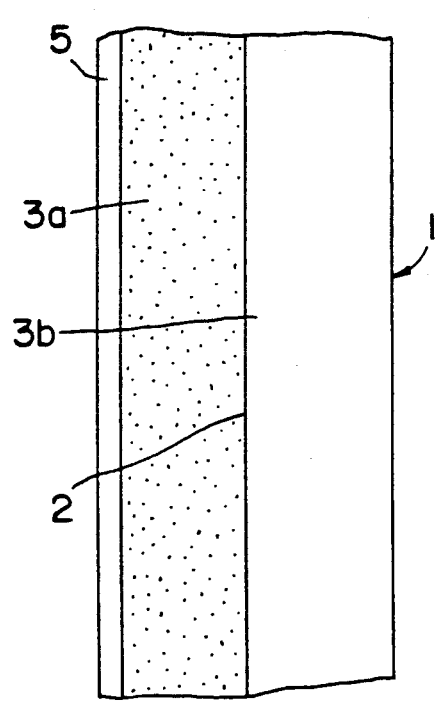

United States Patent [19]

Hanke

[11] Patent Number: 5,098,786
[45] Date of Patent: Mar. 24, 1992

[54] DOUBLE-FACED TAPE

[75] Inventor: Jürgen Hanke, Meerbusch, Fed. Rep. of Germany

[73] Assignee: BPA-Verpackung GmbH, Meerbusch, Fed. Rep. of Germany

[21] Appl. No.: 573,437

[22] Filed: Aug. 27, 1990

[51] Int. Cl.$^5$ .............................. B32B 7/14; B32B 3/04
[52] U.S. Cl. ..................................... 428/343; 428/121; 428/194; 428/354
[58] Field of Search ................ 428/343, 354, 121, 194

[56] References Cited

U.S. PATENT DOCUMENTS

| | | | |
|---|---|---|---|
| 1,726,744 | 9/1929 | Krug | 428/261 X |
| 2,387,593 | 10/1945 | Lesser | 428/343 X |
| 4,348,440 | 9/1982 | Kriozere | 428/121 X |
| 4,421,807 | 12/1983 | Clausing et al. | 428/343 X |
| 4,582,737 | 4/1986 | Torgerson et al. | 428/343 X |
| 4,917,929 | 4/1990 | Heinecke | 428/121 X |
| 5,011,724 | 4/1991 | Wille | 428/343 X |

FOREIGN PATENT DOCUMENTS 2746502 6/1978 Fed. Rep. of Germany .

OTHER PUBLICATIONS 57-127473 Jap. Patent Abst. "Aging Method of Spray Painting and Masking Tape Used for said Method", Shimokubo.

*Primary Examiner*—George F. Lesmes
*Assistant Examiner*—D. R. Zirker
*Attorney, Agent, or Firm*—Sprung Horn Kramer & Woods

[57] ABSTRACT

Double-faced tape, especially masking tape, with two areas on each side separated by a midline. One area on each side is coated with adhesive and is opposite an area coated with non-adhesive on the other side. The other area on each side is coated with non-adhesive and is opposite an area coated with adhesive on the other side. The tape has been folded along the midline with one adhesive-coated area adhering to a non-adhesive-coated area.

2 Claims, 2 Drawing Sheets

DOUBLE-FACED TAPE

The invention concerns double-faced tape, especially masking tape, of the type known from German 3 123 414 A1, for for example.

Single-faced tape, which is coated with adhesive on only one side, and double-faced tape, which is coated with adhesive on both sides, are known. Both types will adhere to surfaces that must be masked prior to painting. Sheets of masking material can also be applied to the double-faced type, however, once the tape has been applied precisely around the edge of the area to be masked. Some known and commercially available double-faced tape has areas that are uncoated or covered with an adhesive-rejecting layer along one edge to facilitate handling while the sheet is being applied and to prevent it from extending beyond the edge of the tape and adhering to the adhesive upper surface of the tape.

The object of the present invention is to provide a double-faced tape that
1. can be employed as either a single-faced or double-faced tape,
2. will, when employed as a double-faced tape, adhere to the surface being masked without any adhesive from one side contaminating the adhesive on the other side, and
3. does not require any separate masking paper or sheet for the areas coated with adhesive.

This object is attained in accordance with the invention in double-faced tape in that the tape is rolled up into a reel folded along its midline and with the unadhesive areas facing each other.

Double-faced tape of this type attains the object of the invention in that the tape is folded in such a way that the second adhesive-coated area is protected while the tape is being applied to the area to be masked. No separate masking paper or sheet is necessary because the second adhesive-coated area of the tape can be exposed just by unfolding the tape, exposing the second adhesive-coated area for securing masking sheet. If it is unnecessary or undesirable to apply masking sheet, the double-faced tape in accordance with the invention can be left folded and accordingly employed as a single-faced tape. The worker's advantage is that he can use the same tape either as a single-faced or as a double-faced tape. It is also possible to use the tape in accordance with the invention first as single-faced and then, after having unfolded it, to secure masking sheet.

A narrow margin is left uncoated along at least one of the adhesive-coated areas in one advantageous embodiment of the tape in accordance with the invention. This margin facilitates unfolding the tape because it will not adhere to the area that is in contact with it while the tape is folded and can accordingly easily be grasped. It is preferable for the margin to be approximately 2 to 6 mm wide. The tape is withdrawn from the roll folded applied to the area that is to be masked, and unfolded if necessary to accommodate masking sheet.

The double-faced tape in accordance with the invention
can be cleanly stripped off,
is very easy to handle,
is, due to the double layer resulting from the folding, very stable,
provides protection for the second adhesive-coated area when folded without additional masking paper or sheet, and
can, due to the uncoated margin, easily be stripped off while being unfolded.

Figure 1B:
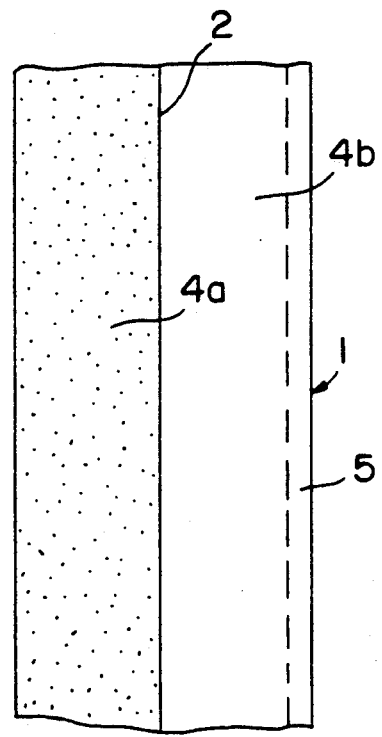
Figure 2:
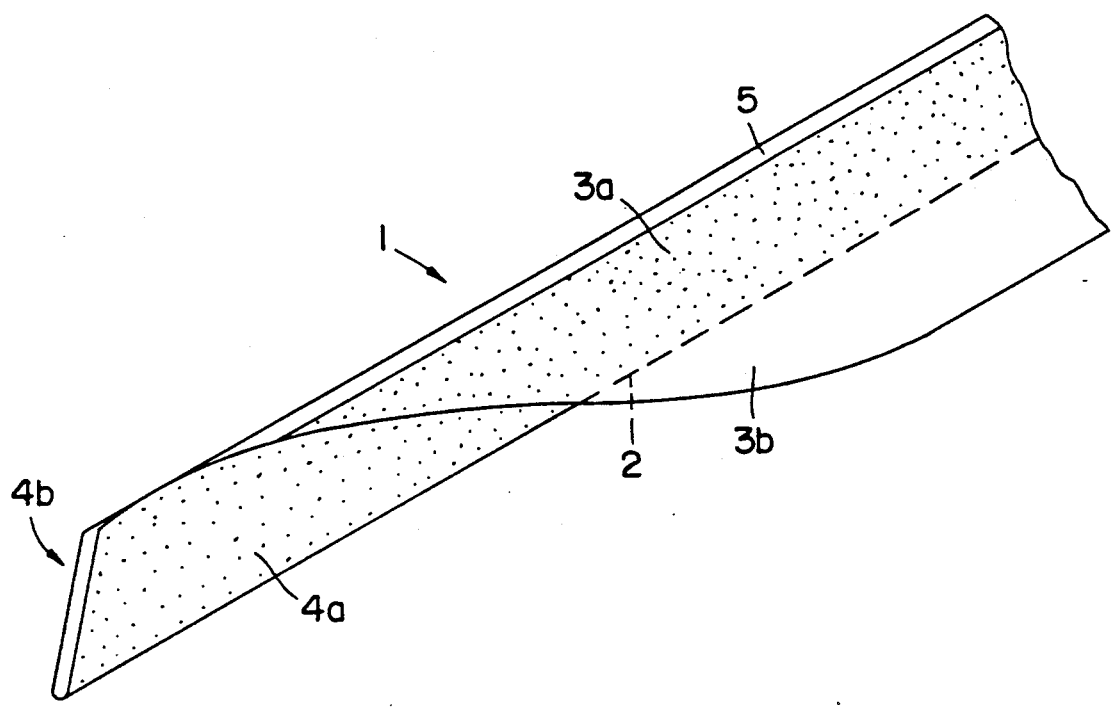
Figure 3:
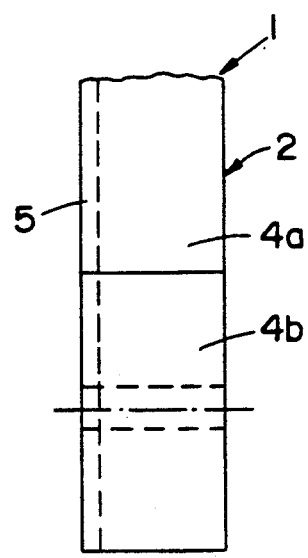

The invention will now be described in greater detail with reference to the drawing, wherein FIG. 1a shows one side and FIG. 1b the other side of a strip of double-faced tape, FIG. 2 shows the tape in both the folded and unfolded operational state, and FIG. 3 shows a folded double-faced tape while being unrolled.

The tape 1 in accordance with the invention is partly coated on each side with adhesive. Each side is divided by a midline 2 into two areas 3a and 3b or 4a and 4b. Each area 3a and 4a is coated with adhesive, while its adjacent area 3b and 4b is coated with a non-adhesive substance. Each adhesive-coated area 3a and 4a has a non-adhesive-coated area 3b and 4b directly behind it on the opposite side of the tape.

The width of adhesive-coated area 3a is decreased by an uncoated border 5, preferably 2 to 6 mm wide.

Once tape 1 has been coated and trimmed, it is folded along midline 2 as illustrated in FIG. 2. Narrower adhesive-coated area 3a will now be in contact with its adjacent non-adhesive-coated area 3b and accordingly protected. The folded tape 1 now has an adhesive-coated side—adhesive-coated area 4a—and its other side—non-adhesive-coated area 4b—is without adhesive. The uncoated border 5 facilitates exposing narrower adhesive-coated area 3a when unfolding tape 1 as illustrated in FIG. 2.

Once tape 1 has been folded together as illustrated in FIG. 3, it can be rolled up or unrolled, with adhesive-coated area 4a coming to rest against the non-adhesive-coated area 4b of the foregoing layer.

The adhesive conventional for masking tape is a non-setting functional adhesive, and the non-adhesive can be chromium stearate, silicone, or a similar material conventionally used to provide non-stick surfaces on backing substrates for self-adhering labels and the like.

It will be understood that the specification and examples are illustrative but not limitative of the present invention and that other embodiments within the spirit and scope of the invention will suggest themselves to those skilled in the art.

What is claimed is:

1. In a double-faced tape having two areas on each side separated by a midline, one area on each side being coated with adhesive and opposite a non-adhesive non-stick area on the other side and the other non-adhesive area on each side opposite an area coated with adhesive on the other side, the improvement wherein the tap is folded along the midline with one adhesive-coated area adhering to a non-adhesive-coated non-stick area, a narrow margin being left uncoated along at least one of the adhesive-coated areas.

2. A tape as in claim 1, wherein the margin is approximately 2 to 6 mm wide.

* * * * *